US009664085B2

(12) United States Patent
Uchiyama et al.

(10) Patent No.: US 9,664,085 B2
(45) Date of Patent: May 30, 2017

(54) EXHAUST PURIFICATION SYSTEM

(71) Applicant: ISUZU MOTORS LIMITED, Tokyo (JP)

(72) Inventors: Tadashi Uchiyama, Kamakura (JP); Hidekazu Fujie, Yamato (JP); Naoto Murasawa, Yamato (JP); Satoshi Hanawa, Fujisawa (JP)

(73) Assignee: ISUZU MOTORS LIMITED, Kawasaki (JP)

( * ) Notice: Subject to any disclaimer, the term of this patent is extended or adjusted under 35 U.S.C. 154(b) by 0 days.

(21) Appl. No.: 15/026,387

(22) PCT Filed: Oct. 8, 2014

(86) PCT No.: PCT/JP2014/076963
§ 371 (c)(1),
(2) Date: Mar. 31, 2016

(87) PCT Pub. No.: WO2015/053324
PCT Pub. Date: Apr. 16, 2015

(65) Prior Publication Data
US 2016/0245141 A1 Aug. 25, 2016

(30) Foreign Application Priority Data
Oct. 8, 2013 (JP) .................................. 2013-210701

(51) Int. Cl.
F01N 3/00 (2006.01)
F01N 3/10 (2006.01)
(Continued)

(52) U.S. Cl.
CPC ............ *F01N 3/208* (2013.01); *F01N 3/021* (2013.01); *F01N 3/103* (2013.01); *F01N 3/106* (2013.01);
(Continued)

(58) Field of Classification Search
CPC .. F01N 13/008; F01N 13/009; F01N 13/0093; F01N 13/0097; F01N 2560/021;
(Continued)

(56) References Cited

U.S. PATENT DOCUMENTS 5,643,536 A * 7/1997 Schmelz ............ B01D 53/8696
324/439
2003/0182935 A1 10/2003 Kawai et al.

FOREIGN PATENT DOCUMENTS

JP 2003-293737 10/2003

OTHER PUBLICATIONS

International Search Report mailed Dec. 16, 2014, in corresponding International Application No. PCT/JP2014/076963.
(Continued)

*Primary Examiner* — Thai Ba Trieu
*Assistant Examiner* — Diem Tran
(74) *Attorney, Agent, or Firm* — Staas & Halsey LLP

(57) ABSTRACT

An exhaust purification system includes a selective catalytic reduction (SCR) catalyst disposed at an exhaust system of an engine for using ammonia that is generated from urea water as a reducing agent to reduce NOx contained in exhaust gas, a device that injects urea water to the SCR catalyst, an inlet-side electrode that detects capacitance within the SCR catalyst at least from a vicinity of an inlet of the SCR catalyst to a vicinity of an intermediate section in an exhaust gas flowing direction, an outlet-side electrode that detects the capacitance within the SCR catalyst at least from the vicinity of the intermediate section to an outlet of the SCR catalyst in the exhaust gas flowing direction, and a calculation unit that calculates an ammonia adsorption amount within the SCR catalyst on a basis of the capacitances detected from the inlet-side and the outlet-side electrodes.

6 Claims, 6 Drawing Sheets

(51) Int. Cl.
- *F01N 3/20* (2006.01)
- *F01N 3/021* (2006.01)
- *F01N 13/00* (2010.01)
- *F02D 9/02* (2006.01)
- *F02D 41/00* (2006.01)
- *B01D 53/94* (2006.01)

(52) U.S. Cl.
CPC ......... *F01N 13/008* (2013.01); *F01N 13/009* (2014.06); *F01N 13/0093* (2014.06); *F01N 13/0097* (2014.06); *F02D 9/02* (2013.01); *F02D 41/0097* (2013.01); *B01D 53/9431* (2013.01); *B01D 53/9495* (2013.01); *B01D 2251/2067* (2013.01); *F01N 2560/021* (2013.01); *F01N 2560/12* (2013.01); *F01N 2900/0601* (2013.01); *F01N 2900/1602* (2013.01); *F01N 2900/1622* (2013.01); *F02D 2009/0294* (2013.01); *Y02T 10/24* (2013.01)

(58) Field of Classification Search
CPC ......... F01N 2560/12; F01N 2900/0601; F01N 2900/1602; F01N 2900/1622; F01N 3/021; F01N 3/103; F01N 3/106; F01N 3/208; F02D 2009/0294; F02D 41/0097; F02D 9/02; B01D 2251/2067; B01D 53/9495; B01D 53/9431; Y02T 10/24
USPC .......................................... 60/286, 301, 303
See application file for complete search history.

(56) References Cited

OTHER PUBLICATIONS

International Preliminary Report on Patentability dated Apr. 12, 2016 in corresponding International Patent Application No. PCT/JP2014/076963.

* cited by examiner (A)

(B)

EXHAUST PURIFICATION SYSTEM

CROSS-REFERENCE TO RELATED APPLICATIONS

This application is a U.S. National Stage Application, which claims the benefit under 35 U.S.C. §371 of PCT International Patent Application No. PCT/JP2014/076963, filed Oct. 8, 2014, which claims the foreign priority benefit under 35 U.S.C. §119 of Japanese Patent Application No. 2013-210701, filed Oct. 8, 2013, the contents of which are incorporated herein by reference.

TECHNICAL FIELD

The present invention relates to an exhaust purification system, and in particular to an exhaust purification system including an NOx catalyst to reduce and purify nitrogen compounds (NOx) contained in exhaust gas.

BACKGROUND ART

As an NOx catalyst arranged in an exhaust system of a diesel engine or the like, a selective catalytic reduction (SCR) catalyst is known which selectively reduces and purifies NOx contained in exhaust gas with ammonia ($NH_3$). Ammonia is used as a reducing agent, and is generated by hydrolysis from an aqueous urea solution (urea water).

If an excessive amount of aqueous urea solution is injected into the SCR catalyst, and an amount of $NH_3$ supplied to the SCR catalyst exceeds $NH_3$ adsorption capacity of the SCR catalyst, then unwanted slip of excess $NH_3$ occurs, and the excess $NH_3$ is emitted to the atmosphere. This is not a desirable situation. Accordingly, there is a known technique of estimating the adsorbed amount of $NH_3$ in the SCR catalyst on the basis of a detection value of an $NH_3$ sensor provided at an outlet of the SCR catalyst, and correcting as necessary an amount of aqueous urea solution to be injected into the SCR catalyst in accordance with the estimated adsorbed amount of $NH_3$ (see, for example, Patent Literature Document 1).

LISTING OF REFERENCES

Patent Literature Document 1: Japanese Patent Application Laid-Open Publication No. 2003-293737

In general, an amount of $NH_3$ adsorbed in the SCR catalyst exhibits an uneven distribution, with a greater amount of $NH_3$ being adsorbed near an inlet of the SCR catalyst than near an outlet of the SCR catalyst. Because the $NH_3$ sensor cannot be arranged directly in the SCR catalyst, it is impossible to accurately recognize the actual adsorbed amount of $NH_3$ in the SCR catalyst with the $NH_3$ sensor. Therefore, the technique of estimating the adsorbed amount of $NH_3$ on the basis of the sensor value of the $NH_3$ sensor may not be able to achieve an optimum correction to the injection amount of the aqueous urea solution in accordance with the actual adsorbed amount of $NH_3$.

SUMMARY OF THE INVENTION

A system disclosed herein is designed to detect an adsorbed amount of $NH_3$ in the SCR catalyst with high precision.

A system disclosed herein includes: at least one selective reduction catalyst arranged in an exhaust system (exhaust gas passage) of an internal combustion engine to reduce and purify nitrogen compounds contained in exhaust gas with ammonia generated from an aqueous urea solution as a reducing agent; an aqueous urea solution injection unit for injecting the aqueous urea solution to the selective reduction catalyst; a first capacitance detecting unit for detecting (measuring) capacitance of the selective reduction catalyst at least from a vicinity of an inlet of the selective reduction catalyst to a vicinity of a middle of the selective reduction catalyst in an exhaust gas flowing direction; a second capacitance detecting unit for detecting the capacitance of the selective reduction catalyst at least from the vicinity of the middle of the selective reduction catalyst to a vicinity of an outlet of the selective reduction catalyst along the exhaust gas flowing direction; and a reducing agent adsorption amount calculation unit for calculating an adsorbed amount of the reducing agent in the selective reduction catalyst on the basis of the capacitance entered from the first capacitance detecting unit and the capacitance entered from the second capacitance detecting unit.

According to the system disclosed herein, it is possible to precisely detect an amount of $NH_3$ adsorbed in the SCR catalyst.

DETAILED DESCRIPTION

Figure 1:
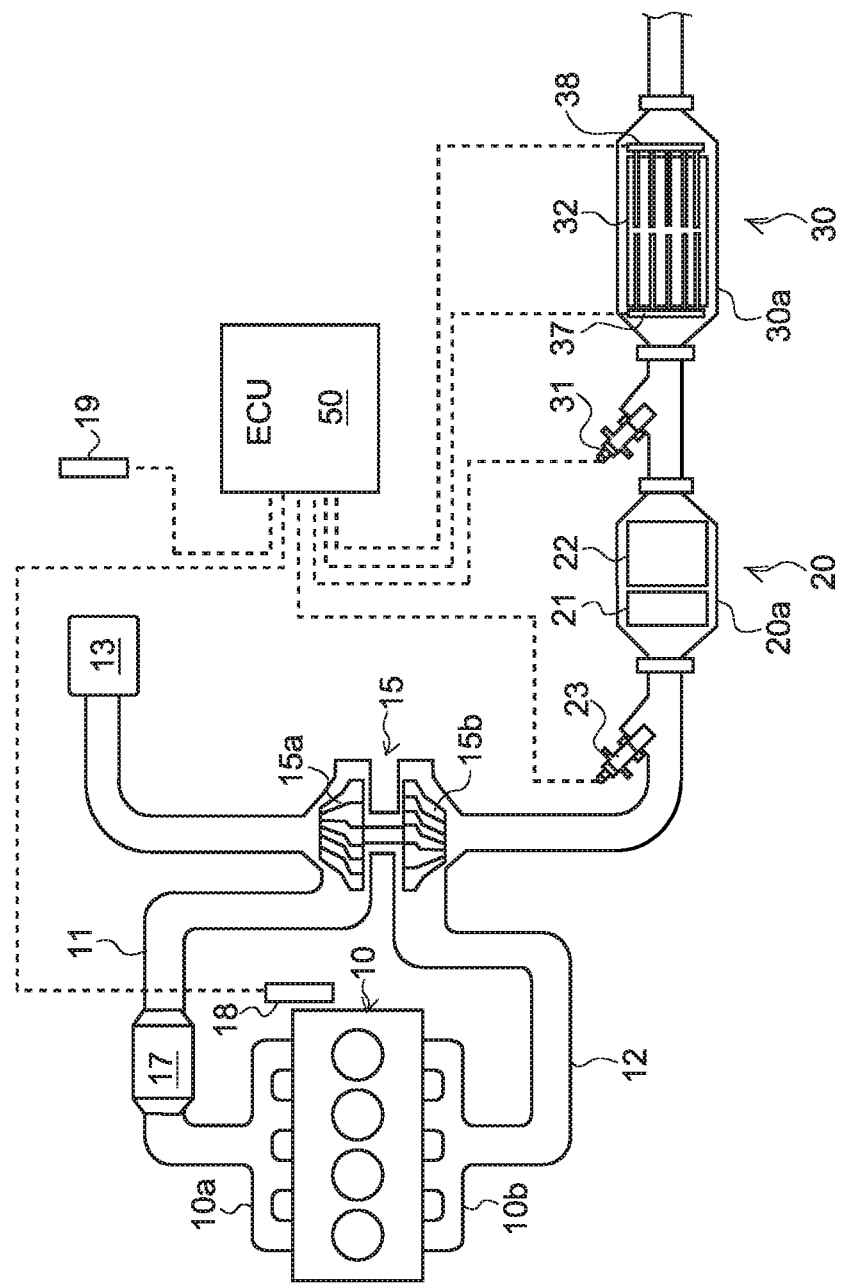
FIG. 1 is a schematic overall configuration diagram illustrating an exhaust purification system according to an embodiment of the present invention.

Hereinafter, an exhaust purification system according to embodiments of the present invention will be described with reference to the accompanying drawings. Like parts are designated by like reference numerals, and such like parts have like names and functions. Accordingly, redundant detailed descriptions of such like parts will be omitted.

As shown in FIG. 1, a diesel engine (hereinafter referred to simply as "engine") 10 has an intake manifold 10a and an exhaust manifold 10b. An intake passage 11 for introducing fresh air is connected to the intake manifold 10a, and an exhaust passage 12 for discharging exhaust gas to the atmosphere is connected to the exhaust manifold 10b.

On the intake passage 11, disposed are an air cleaner 13, a compressor 15a of a turbo charger 15, an intercooler 17, and so on in this order from the upstream side in the intake air flowing direction. On the exhaust passage 12, disposed a turbine 15b of the turbo charger 15, an upstream after-treatment system 20, a downstream after-treatment system 30, and so on in this order from the upstream side in the exhaust gas flowing direction. It should be noted in FIG. 1 that reference numeral "18" denotes an engine rotation speed sensor, and reference numeral "19" denotes an accelerator opening degree sensor.

The upstream after-treatment system 20 includes a catalyst casing 20a, an oxidation catalyst (a diesel oxidation catalyst, which will be hereinafter referred to as "DOC") 21, and a diesel particulate filter (hereinafter referred to as "DPF") 22, with the DOC 21 and the DPF 22 arranged in this order from the upstream side in the gas exhaust flowing direction in the catalyst casing 20a. In addition, an exhaust pipe injection device (in-pipe injection device) 23 is arranged at a position upstream of the DOC 21.

The exhaust pipe injection device 23 injects unburnt fuel (mainly HC) into the exhaust passage 12 at a position upstream of the DOC 21 in response to an instruction signal entered from an electronic control unit (hereinafter referred to as "ECU") 50. It should be noted that in the case where post-injection by means of multi-stage injections of the engine 10 is employed, the exhaust pipe injection device 23 may be omitted.

The DOC 21 has a ceramic support having, for example, a cordierite honeycomb structure, and catalytic components supported on a surface of the ceramic support. As the unburnt fuel (HC) is supplied to the DOC 21 by the exhaust pipe injection device 23 or the post-injection, the DOC 21 oxidizes the unburnt fuel to raise the temperature of the exhaust gas.

The DPF 22 has, for example, a large number of cells defined by porous partitions and arranged along the exhaust gas flowing direction, with the upstream and downstream sides of the cells being sealed or plugged alternately. The DPF 22 collects particulate matter (PM) in the exhaust gas that collects in pores of the partitions and on surfaces of the partitions. When an estimated amount of accumulated PM reaches a predetermined amount, so-called forced regeneration is carried out, i.e., the accumulated PM is burnt for removal. The forced regeneration is accomplished by supplying the unburnt fuel (HC) into the DOC 21 through the exhaust pipe injection device 23 or the post-injection, and thus increasing the temperature of the exhaust gas flowing into the DPF 22 up to a PM combustion temperature (for example, about 500 to 600 degrees C.).

The downstream after-treatment system 30 includes an aqueous urea solution injection device 31, a casing 30a, and an SCR catalyst 32 received in the casing 30a, with the aqueous urea solution injection device 31 being arranged upstream of the SCR catalyst 32 with respect to the gas exhaust flowing direction.

The aqueous urea solution injection device 31 is an example of aqueous urea solution injection unit according to the present invention, and injects an aqueous urea solution from an aqueous urea solution tank (not shown) into the exhaust passage 12 at a position upstream of the SCR catalyst 32 in response to an instruction signal introduced from the ECU 50. The injected aqueous urea solution is hydrolyzed to $NH_3$ through exhaust gas heat, and $NH_3$ is supplied to the SCR catalyst 32 on the downstream side as a reducing agent.

The SCR catalyst 32 has a ceramic support having, for example, a honeycomb structure, and zeolite or the like supported on a surface of the ceramic support. The SCR catalyst 32 includes a large number of cells defined by porous partitions and arranged along the exhaust gas flowing direction. The SCR catalyst 32 adsorbs $NH_3$ supplied as the reducing agent, and the adsorbed $NH_3$ selectively reduces NOx contained in the exhaust gas passing through the SCR catalyst 32 for purification of the exhaust gas. In addition, the SCR catalyst 32 of this embodiment has a plurality of inlet-side electrodes 37 which are arranged opposite to one another with at least one partition placed therebetween to form capacitors, and a plurality of outlet-side electrodes 38 which are arranged opposite to one another with at least one partition placed therebetween to form capacitors.

The inlet-side electrodes 37 are inserted in the cells of the SCR catalyst 32 from the inlet (i.e., upstream side) up to the vicinity of a substantial middle (center) of the SCR catalyst 32 in the exhaust gas flowing direction. The outlet-side electrodes 38 are inserted in the cells of the SCR catalyst 32 from the outlet (i.e., downstream side) up to the vicinity of the substantial middle of the SCR catalyst 32 in the exhaust gas flowing direction. An outer surface of each of the inlet-side electrodes 37 and the outlet-side electrodes 38 is coated with a corrosion-resistant insulating layer (not shown). Each of the inlet-side electrodes 37 and the outlet-side electrodes 38 is electrically connected to the ECU 50 through a capacitance detecting circuit (not shown). The inlet-side electrodes 37, the outlet-side electrodes 38, and the capacitance detecting circuits (not shown) are preferred examples of capacitance detecting unit according to the present invention.

Figure 2:
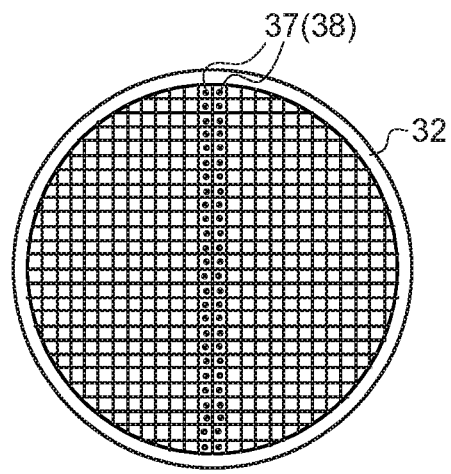
FIGS. 2A and 2B illustrate examples of arrangement patterns of electrodes according to embodiments of the present invention.
Figure 2:
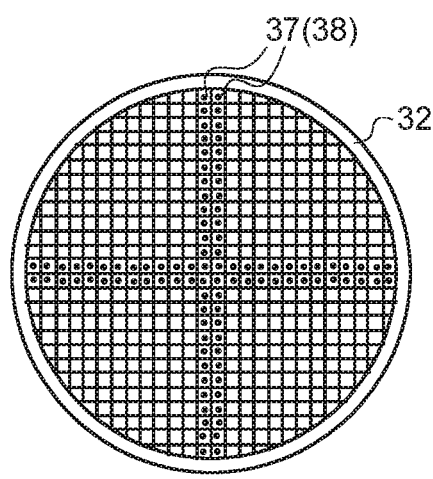

Preferable arrangement patterns of the inlet-side electrodes 37 and the outlet-side electrodes 38 include, for example, a pattern in which two rows each extending in a diametrical direction of the SCR catalyst 32 are arranged in parallel as illustrated in FIG. 2(A), and a pattern in which two sets of diametrical rows cross each other as illustrated in FIG. 2(B). Such patterns allow effective detection of overall capacitance inside the SCR catalyst 32.

The ECU 50 performs various types of control, such as control over the engine 10, the aqueous urea solution injection device 31, and so on, and includes a CPU, a ROM, a RAM, input ports, output ports, and so on which are known in the art.

Figure 3:
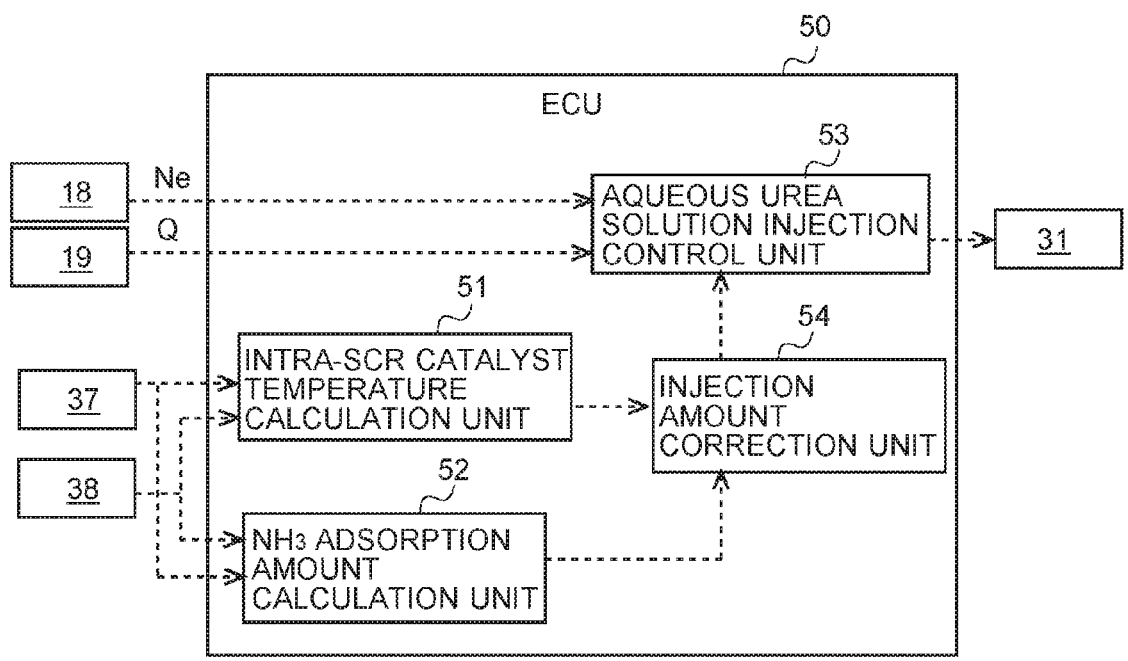
FIG. 3 is a functional block diagram illustrating an ECU according to the embodiment of an present invention.

As shown in FIG. 3, the ECU 50 includes an intra-SCR temperature calculation unit 51, an $NH_3$ adsorption amount calculation unit 52, an aqueous urea solution injection control unit 53, and an injection amount correction unit 54 as functional components thereof. It is assumed in the following description that all of these functional components are included in the ECU 50, which is a single piece of hardware. Alternatively, one or more of these functional components may be included in a separate piece of hardware.

The intra-SCR temperature calculation unit 51 is an example of an internal temperature calculation unit according to the present invention, and calculates an internal temperature (inside temperature) of the SCR catalyst 32 on the basis of capacitance between the inlet-side electrodes 37 and capacitance between the outlet-side electrodes 38. In general, the capacitance C between the electrodes 37, 38 is given by Equation 1, where □ is the permittivity of a medium between the electrodes 37, 38, S is the area of the electrodes 37, 38, and d is the distance between the electrodes 37, 38.

$$C = \varepsilon \times \frac{S}{d} \qquad \text{[Equation 1]}$$

In Equation 1, the area S of the electrodes 37, 38 and the distance d are constant, and a change in the permittivity ϵ effected by the temperature of the exhaust gas causes a change in the capacitance C. Therefore, the internal temperature of the SCR catalyst 32 can be calculated by detecting the capacitance C between the electrodes 37, 38.

Figure 4:
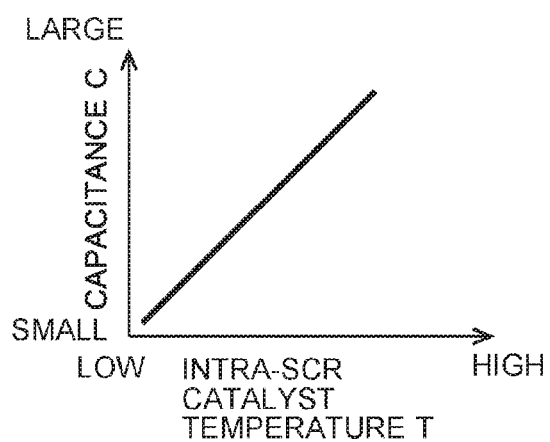
FIG. 4 is a diagram illustrating an example of a capacitance-temperature characteristics map according to an embodiment of the present invention.

The ECU 50 stores a capacitance-temperature characteristics map (see, for example, FIG. 4) representing the relationship between the capacitance C and the intra-SCR catalyst temperature T. The map is prepared in advance on the basis of experiments or the like. The intra-SCR catalyst temperature calculation unit 51 reads a value corresponding to the capacitance C between the inlet-side electrodes 37 from the capacitance-temperature characteristics map to calculate an inlet-side internal temperature $T_{SCR\ IN}$ of the SCR catalyst 32. Further, the intra-SCR catalyst temperature calculation unit 51 reads a value corresponding to the capacitance C between the outlet-side electrodes 38 from the capacitance-temperature characteristics map to calculate an outlet-side internal temperature $T_{SCR\ OUT}$ of the SCR catalyst 32. It should be noted that each of the inlet-side internal temperature $T_{SCR\ IN}$ and the outlet-side internal temperature $T_{SCR\ OUT}$ may not necessarily be calculated using the map. For example, each of the inlet-side internal temperature $T_{SCR\ IN}$ and the outlet-side internal temperature $T_{SCR\ OUT}$ may be calculated using an approximate equation or the like, which is prepared in advance on the basis of experiments or the like.

The $NH_3$ adsorption amount calculation unit 52 is an example of a reducing agent adsorption amount calculation unit according to the present invention, and calculates an actual amount of $NH_3$ adsorbed by the SCR catalyst 32 on the basis of the capacitance between the inlet-side electrodes 37 and the capacitance between the outlet-side electrodes 38. $NH_3$ has a high permittivity □. As the adsorption of $NH_3$ by the SCR catalyst 32 progresses, the capacitance C between the electrodes 37, 38 increases (see Equation 1). Therefore, the actual amount of $NH_3$ adsorbed by the SCR catalyst 32 can be calculated by detecting the capacitance C between the electrodes 37, 38.

Figure 5:
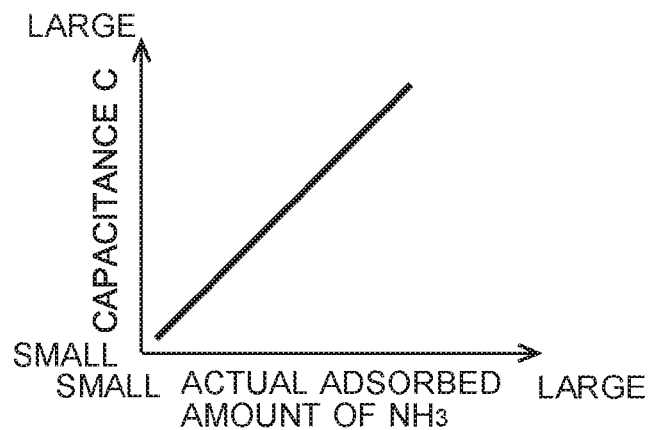
FIG. 5 is a diagram illustrating an example of a capacitance-$NH_3$ adsorption amount map according to an embodiment of the present invention.

The ECU 50 stores a capacitance-$NH_3$ adsorption amount map (see, for example, FIG. 5) representing the relationship between the capacitance C and the actual adsorbed amount $ST_{NH3}$ of $NH_3$. The map is prepared in advance on the basis of experiments or the like. The $NH_3$ adsorption amount calculation unit 52 reads a value corresponding to the capacitance C between the inlet-side electrodes 37 from the capacitance-NH3 adsorption amount map to calculate an actual adsorbed amount $ST_{NH3\ IN}$ of $NH_3$ on an inlet side of the SCR catalyst 32. The $NH_3$ adsorption amount calculation unit 52 also reads a value corresponding to the capacitance C between the outlet-side electrodes 38 from the capacitance-NH3 adsorption amount map to calculate an actual adsorbed amount $ST_{NH3\ OUT}$ of $NH_3$ on an outlet side of the SCR catalyst 32. It should be noted that each of the actual adsorbed amount $ST_{NH3\ IN}$ of $NH_3$ on the inlet side and the actual adsorbed amount $ST_{NH3\ OUT}$ of $NH_3$ on the outlet side may not necessarily be calculated using the map. For example, each of the actual adsorbed amount $ST_{NH3\ IN}$ of $NH_3$ and the actual adsorbed amount $ST_{NH3\ OUT}$ of $NH_3$ may be calculated using an approximate equation or the like, which is prepared in advance on the basis of experiments or the like.

The aqueous urea solution injection control unit 53 is an example of an injection control unit according to the present invention, and controls the amount of the aqueous urea solution injected by the aqueous urea solution injection device 31 on the basis of an operating state (running condition) of the engine 10 and/or the like. Specifically, the aqueous urea solution injection control unit 53 calculates the amount of NOx emission from the engine 10 on the basis of an engine rotation (revolution) speed Ne and an accelerator opening degree Q, and sets a standard injection amount $INJ_{U\ std}$ of the aqueous urea solution required for this amount of NOx emission. The standard injection amount $INJ_{U\ std}$ is corrected as necessary by the injection amount correction unit 54, which will be described below.

The injection amount correction unit 54 is an example of an injection amount correction unit according to the present invention, and corrects the standard injection amount $INJ_{U\ std}$ set by the aqueous urea solution injection control unit 53 on the basis of the inlet-side internal temperature $T_{SCR\ IN}$ and the outlet-side internal temperature $T_{SCR\ OUT}$, which are entered from the intra-SCR catalyst temperature calculation unit 51, and the actual adsorbed amount $ST_{NH3\ IN}$ of $NH_3$ on the inlet side and the actual adsorbed amount $ST_{NH3\ OUT}$ of $NH_3$ on the outlet side, which are entered from the $NH_3$ adsorption amount calculation unit 52.

Specifically, the ECU 50 stores a maximum adsorbable $NH_3$ amount map (see, for example, FIG. 6) representing the relationship between the internal temperature $T_{SCR}$ of the SCR catalyst 32 and the maximum adsorbable $NH_3$ amount $ST_{NH3\ MAX}$. The map is prepared in advance on the basis of experiments or the like.

The injection amount correction unit 54 reads an inlet-side adsorption amount difference $\Delta ST_{NH3\ IN}$ ($=ST_{NH3\ MAX\ IN}-ST_{NH3\ IN}$), which is a difference between an inlet-side maximum adsorbable amount $ST_{NH3\ MAX\ IN}$ corresponding to a current inlet-side internal temperature $T_{SCR\ IN}$ and a current actual adsorbed amount $ST_{NH3\ IN}$ of $NH_3$ on the inlet side, from the maximum adsorbable $NH_3$ amount map. Further, the injection amount correction unit 54 reads an outlet-side adsorption amount difference $\Delta ST_{NH3\ OUT}$($=ST_{NH3\ MAX\ OUT}-ST_{NH3\ OUT}$), which is a difference between an outlet-side maximum adsorbable amount $ST_{NH3\ MAX\ OUT}$ corresponding to a current outlet-side internal temperature $T_{SCR\ OUT}$ and a current actual adsorbed amount $ST_{NH3\ OUT}$ of $NH_3$ on the outlet side, from the maximum adsorbable $NH_3$ amount map. Then, the injection amount correction unit 54 corrects (i.e., makes an addition to or a subtraction from) the standard injection amount $INJ_{U\ std}$ on the basis of an injection correction amount $\Delta INJ$ corresponding to the sum $\Delta ST_{NH3}$ ($=\Delta ST_{NH3\ IN}+\Delta ST_{NH3\ OUT}$) of the inlet-side adsorption amount difference $\Delta ST_{NH3\ IN}$ and the outlet-side adsorption amount difference $\Delta ST_{NH3\ OUT}$ (i.e., $INJ_{U\ exh}=INJ_{U\ std}\pm\Delta INJ$). After the correction, the aqueous urea solution is injected with an increased or reduced width of a pulse applied to an injector (not shown) of the aqueous urea solution injection device 31 for each injection, or with an increased or reduced number of injections.

Figure 7:
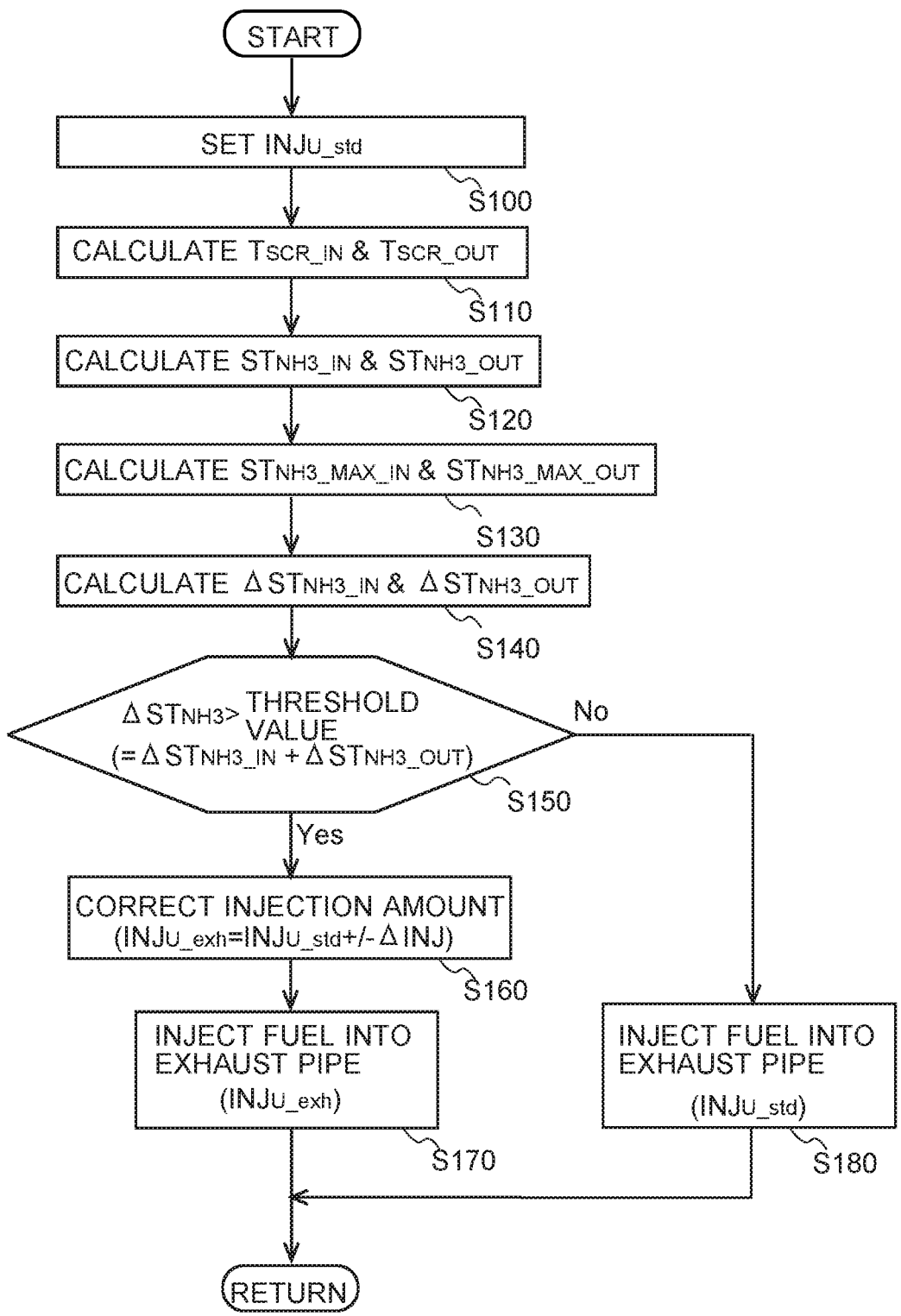
FIG. 7 is a flowchart illustrating control according to an embodiment of the present invention.

Next, a control flow of the exhaust purification system according to this embodiment will now be described below with reference to FIG. 7. The control starts upon turning on of an ignition key.

At Step (hereinafter "Step" will be denoted simply as "S") 100, the standard injection amount $INJ_{U\ std}$ of the aqueous urea solution is set in accordance with the amount of NOx emission from the engine 10 calculated on the basis of the engine revolution speed Ne and the accelerator opening degree Q.

At S110, the inlet-side internal temperature $T_{SCR\ IN}$ of the SCR catalyst 32 is calculated on the basis of the capacitance C between the inlet-side electrodes 37, and the outlet-side internal temperature $T_{SCR\ OUT}$ of the SCR catalyst 32 is calculated on the basis of the capacitance C between the outlet-side electrodes 38.

At S120, the actual adsorbed amount $ST_{NH3\ IN}$ of $NH_3$ on the inlet side of the SCR catalyst 32 is calculated on the basis of the capacitance C between the inlet-side electrodes 37, and the actual adsorbed amount $ST_{NH3\ OUT}$ of $NH_3$ on the outlet side of the SCR catalyst 32 is calculated on the basis of the capacitance C between the outlet-side electrodes 38.

Figure 6:
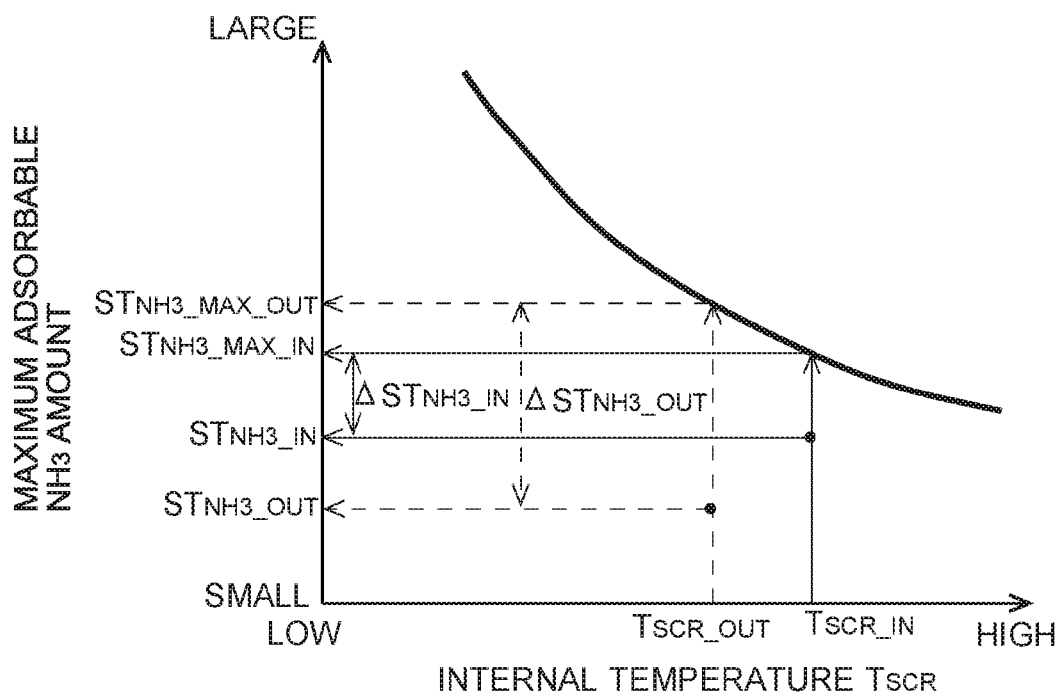
FIG. 6 is a diagram illustrating an example of a maximum adsorbable $NH_3$ amount map according to the embodiment of an present invention.

At S130, the inlet-side maximum adsorbable amount $ST_{NH3\ MAX\ IN}$ corresponding to the inlet-side internal temperature $T_{SCR\ IN}$ calculated at S110, and the outlet-side maximum adsorbable amount $ST_{NH3\ MAX\ OUT}$ corresponding to the outlet-side internal temperature $T_{SCR\ OUT}$ calculated at S110 are calculated on the basis of the maximum adsorbable $NH_3$ amount map (FIG. 6).

At S140, the inlet-side adsorption amount difference $\Delta ST_{NH3\ IN}(=ST_{NH3\ MAX\ IN}-ST_{NH3\ IN})$, which is a difference between the inlet-side maximum adsorbable amount $ST_{NH3\ MAX\ IN}$ calculated at S130 and the actual adsorbed amount $ST_{NH3\ IN}$ of $NH_3$ on the inlet side calculated at S120, is calculated, and the outlet-side adsorption amount difference $\Delta ST_{NH3\ OUT}(=ST_{NH3\ MAX\ OUT}-ST_{NH3\ OUT})$, which is a difference between the outlet-side maximum adsorbable amount $ST_{NH3\ MAX\ OUT}$ calculated at S130 and the actual adsorbed amount $ST_{NH3\ OUT}$ of $NH_3$ on the outlet side calculated at S120, is calculated.

At S150, it is determined whether the sum $\Delta ST_{NH3}$ $(=\Delta ST_{NH3\ IN}+\Delta ST_{NH3\ OUT})$ of the inlet-side adsorption amount difference $\Delta ST_{NH3\ IN}$ and the outlet-side adsorption amount difference $\Delta ST_{NH3\ OUT}$ calculated at S140 is greater than a predetermined threshold value. If the sum $\Delta ST_{NH3}$ is greater than the predetermined threshold value (i.e., if Yes), the control proceeds to S160, and the standard injection amount $INJ_{U\ std}$ is corrected (i.e., an addition or a subtraction is made to or from the standard injection amount $INJ_{U\ std}$) on the basis of the injection correction amount $\Delta INJ$ corresponding to the sum $\Delta ST_{NH3}$ (i.e., $INJ_{U\ exh}=INJ_{U\ std}\pm\Delta INJ$). At S170, the aqueous urea solution is injected from the aqueous urea solution injection device 31 on the basis of a corrected injection amount $INJ_{U\ exh}$.

On the other hand, if it is determined at S150 that the sum $\Delta ST_{NH3}$ is not greater than the predetermined threshold value (i.e., if No), the control proceeds to S180, and the aqueous urea solution is injected from the aqueous urea solution injection device 31 on the basis of the standard injection amount $INJ_{U\ std}$ set at S100 without a correction being made. Thereafter, S100 to S180 are repeatedly performed until the ignition key is turned off.

Next, beneficial effects of the exhaust purification system according described above will be described below.

As a conventional technique to reduce $NH_3$ slip from the SCR catalyst, there is a known method of estimating the adsorbed amount of $NH_3$ in the SCR catalyst on the basis of a detection value of an $NH_3$ sensor provided at an outlet of the SCR catalyst, and correcting the injection amount of the aqueous urea solution in accordance with the estimated adsorbed amount of $NH_3$. However, the method of estimating the adsorbed amount of $NH_3$ on the basis of the sensor value of the $NH_3$ sensor may not allow an accurate recognition of the actual adsorbed amount of $NH_3$ in the SCR catalyst. This may lead to a failure to optimally control the injection amount of the aqueous urea solution.

On the contrary, the exhaust purification system described above is configured to directly calculate the adsorbed amount of $NH_3$ in the SCR catalyst 32 on the basis of the capacitance between the inlet-side electrodes 37 inserted into the SCR catalyst 32 from the inlet up to a middle portion of the SCR catalyst 32, and the capacitance between the outlet-side electrodes 38 inserted into the SCR catalyst 32 from the outlet up to the middle portion of the SCR catalyst 32, and to correct the injection amount of the aqueous urea solution as necessary in accordance with a difference between an accurate actual adsorbed amount of $NH_3$ and a maximum adsorbable $NH_3$ amount.

Accordingly, the exhaust purification system of this embodiment can highly precisely detect an amount of $NH_3$ adsorbed over the entire region of the SCR catalyst 32 from the inlet to the outlet of the SCR catalyst 32. Moreover, it is possible to accurately control the injection amount of the aqueous urea solution in accordance with the actual adsorbed amount of $NH_3$ in the SCR catalyst 32. This leads to a secure prevention of $NH_3$ slip from the SCR catalyst 32 and an effective improvement in the NOx reduction and purification. The need to arrange a DOC or the like on the downstream side of the SCR catalyst 32 to oxidize and remove excess $NH_3$ is eliminated. This leads to effective reductions in cost, weight, size, etc. of the system as a whole.

It should be noted that the present invention is not limited to the above-described embodiments, and that modifications can be made to the above-described embodiments as appropriate without departing from the scope and spirit of the present invention.

Figure 8:
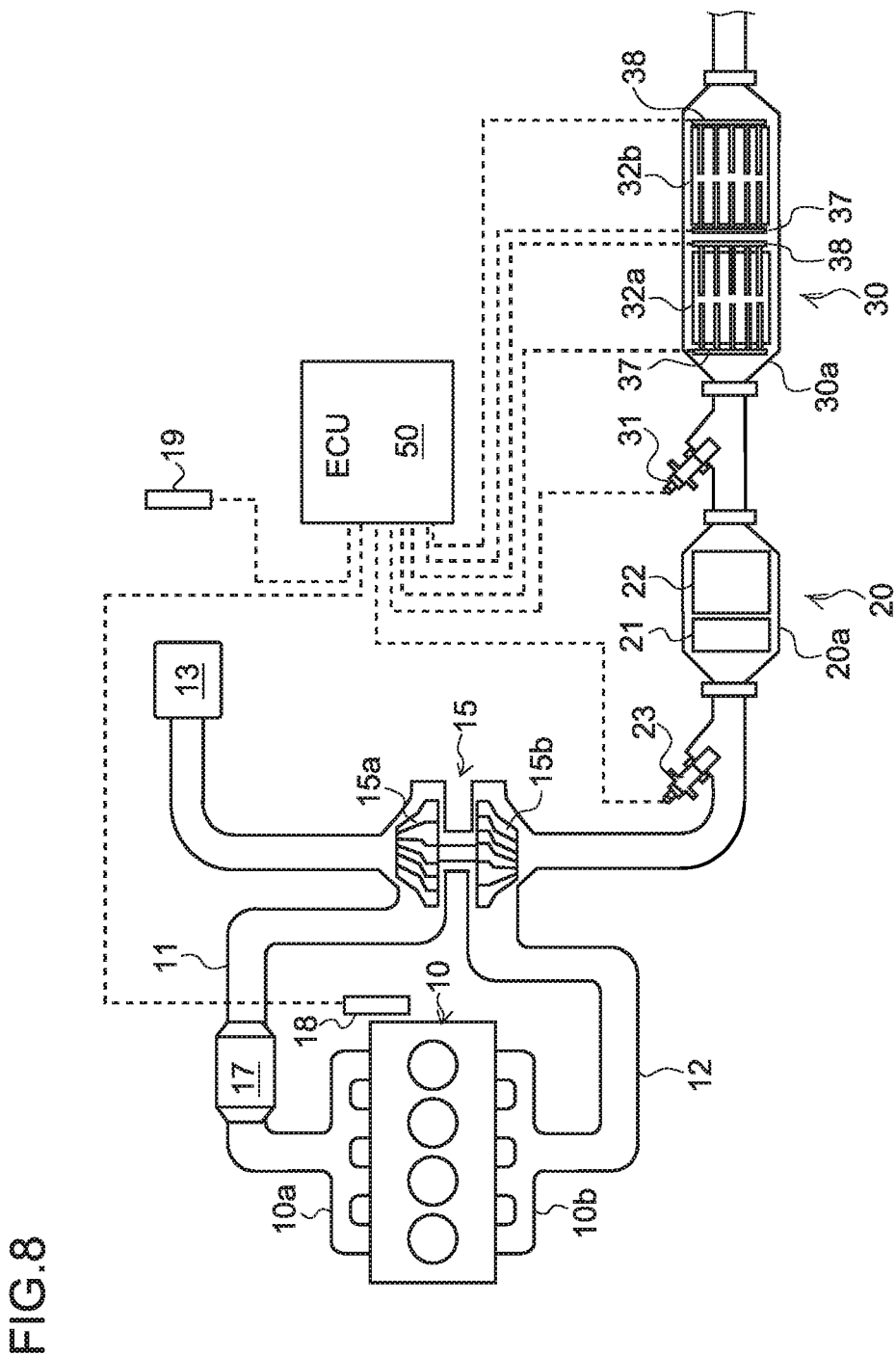
FIG. 8 is a schematic overall configuration diagram illustrating an exhaust purification system according to another embodiment of the present invention.

For example, referring to FIG. 8, the SCR catalyst 32 may be divided into a plurality of SCR catalyst segments (two SCR catalyst segments in the example of FIG. 8) depending on, for example, the capacity of the SCR catalyst 32. In this configuration, each of the SCR catalyst segments 32a and 32b has inlet-side electrodes 37 and outlet-side electrodes 38. It should also be noted that the number of electrodes 37 and the number of electrodes 38 are not limited to the numbers as illustrated in the accompanying drawings, but the number of electrodes 37 (38) may be two, which forms a pair, or any number greater than two. The engine 10 is not limited to the diesel engine. The present invention can be widely applied to other internal combustion engines, such as, for example, gasoline engines.

The invention claimed is:

1. An exhaust purification system comprising:
   at least one selective reduction catalyst arranged in an exhaust system of an internal combustion engine and configured to reduce nitrogen compounds contained in exhaust gas with ammonia generated from an aqueous urea solution as a reducing agent for purification of the exhaust gas;
   an aqueous urea solution injector injecting the aqueous urea solution into the selective reduction catalyst;
   a first capacitance sensor in the selective reduction catalyst detecting a first capacitance in the selective reduction catalyst, at least from a vicinity of an inlet of the selective reduction catalyst to a vicinity of a middle of the selective reduction catalyst in an exhaust gas flowing direction;
   a second capacitance sensor in the selective reduction catalyst detecting a second capacitance in the selective reduction catalyst, at least from a vicinity of a middle of the selective reduction catalyst to a vicinity of an outlet of the selective reduction catalyst in the exhaust gas flowing direction; and
   an electronic controller configured to
      calculate an actual adsorbed amount of the reducing agent on an inlet side of the selective reduction catalyst based on the detected first capacitance and an actual absorbed amount of the reducing agent on an outlet side of the selective reduction catalyst based on the detected second capacitance;

inject the aqueous urea solution from the aqueous urea solution injector based on a predetermined standard injection amount set in accordance with at least a running condition of the internal combustion engine, calculate an inlet-side internal temperature of the selective reduction catalyst based on the detected first capacitance and an outlet-side internal temperature of the selective reduction catalyst based on the detected second capacitance, and correct the standard injection amount based on an injection correction amount corresponding to a sum of an inlet-side adsorption amount difference and an outlet-side adsorption amount difference, wherein the inlet-side adsorption amount difference is a difference between an inlet-side maximum adsorbable amount corresponding to the inlet-side internal temperature and the actual adsorbed amount on the inlet side, and wherein the outlet-side adsorption amount difference is a difference between an outlet-side maximum adsorbable amount corresponding to the outlet-side internal temperature and the actual adsorbed amount on the outlet side.

2. The exhaust purification system according to claim 1, wherein said at least one selective reduction catalyst includes a plurality of selective reduction catalysts.

3. The exhaust purification system according to claim 1, wherein the internal combustion engine is a diesel engine.

4. The exhaust purification system according to claim 1, wherein the first capacitance sensor includes at least one pair of first electrodes inserted into cells of the selective reduction catalyst from the vicinity of the inlet up to the vicinity of the middle of the selective reduction catalyst in the exhaust gas flowing direction to form a first capacitor; and the second capacitance sensor includes at least one pair of second electrodes inserted into cells of the selective reduction catalyst from the vicinity of the outlet up to the vicinity of the middle of the selective reduction catalyst along the exhaust gas flowing direction to form a second capacitor.

5. The exhaust purification system according to claim 4, wherein said at least one pair of first electrodes includes plural pairs of first electrodes arranged in a diametrical direction of the selective reduction catalyst.

6. The exhaust purification system according to claim 4, wherein said at least one pair of second electrodes includes plural pairs of second electrodes arranged in a diametrical direction of the selective reduction catalyst.

* * * * *